United States Patent [19]

Lanza et al.

[11] Patent Number: 6,150,463
[45] Date of Patent: Nov. 21, 2000

[54] VINYL AROMATIC/CONJUGATED DIENE BLOCK COPOLYMERS DEACTIVATED TO ALKALI METAL-ALCOHOLATE TERMINATION AND TREATED WITH CYCLIC ANHYDRIDE

[75] Inventors: Emmanuel Lanza, Waterloo; Jean Naveau, Nivelles, both of Belgium

[73] Assignee: Fina Research, S.A., Feluy, Belgium

[21] Appl. No.: 09/189,685

[22] Filed: Nov. 10, 1998

Related U.S. Application Data

[63] Continuation of application No. 08/394,686, Feb. 24, 1995, abandoned.

[30] Foreign Application Priority Data

Feb. 24, 1996 [EP] European Pat. Off. .............. 94870036

[51] Int. Cl.$^7$ ............................. C08F 4/08; C08F 297/04
[52] U.S. Cl. ........................... 525/98; 525/250; 525/285; 525/366; 525/385; 525/386
[58] Field of Search .............................. 525/98, 250, 285, 525/366, 385, 386

[56] References Cited

U.S. PATENT DOCUMENTS 4,835,220   5/1989   Bronstert et al. ...................... 525/250

FOREIGN PATENT DOCUMENTS 479754   4/1992   European Pat. Off. .

Primary Examiner—Robert E. L. Sellers
Attorney, Agent, or Firm—William D. Jackson; Jim D. Wheelington

[57] ABSTRACT

The present invention related to a process for the treatment of vinyl aromatic/conjugated diene block copolymers. More particularly, the present invention relates to a process for the treatment of such copolymers obtained starting from a (co)polymerization-initiating stage performed by means of alkaline based catalysts (Me), deactivated in such a way that they show a termination of the alkali metal-alcoholate type (—O—Me), and treated with a cyclic anhydride of polycarboxylic acid, and optically a $C_2$–$C_4$ monocarboxylic acid.

8 Claims, No Drawings

VINYL AROMATIC/CONJUGATED DIENE BLOCK COPOLYMERS DEACTIVATED TO ALKALI METAL-ALCOHOLATE TERMINATION AND TREATED WITH CYCLIC ANHYDRIDE

CROSS REFERENCE TO RELATED APPLICATION

This application is a continuation application of a prior-filed copending application of the same title, U.S. Ser. No. 08/394,686, by Lanza et al., filed Feb. 24, 1995, abandoned.

BACKGROUND OF THE INVENTION

The invention relates to a process for the treatment of resinous polymers of the vinyl aromatic/conjugated diene block copolymer type. More particularly the invention relates to a process for the treatment of such copolymers obtained starting from a (co)polymerization—initiating stage performed by means of alkaline metal based catalysts (Me).

French Patent 1,149,159 discloses a process for removing the deep color, due to hydrogenation catalysts, of hydrogenated rubber polymers by means of a mineral acid or of a monocarboxylic or polycarboxylic acid; the result is transparent but yellowish polymers. Further it was found that the decolored polymers according to this process tend to absorb water which causes an increase of their opacity with time.

European Patent 479,754 discloses a process for the decoloration of resinous polymers of the vinyl aromatic/conjugated diene type consisting in the treatment of these copolymers with a monocarboxylic acid having from 3 to 5 carbon atoms.

However, in the case of copolymers of resinous types, more particularly those disclosed in U.S. Pat. Nos. 3,639,517 and 4,091,053, the coloring is mainly due to the initiating agents. Not only for the appearance, but also for uses in the field of foodstuffs, it is very important to make this yellowish coloring disappear and to obtain completely transparent copolymers from which the color has been removed.

Methods are known for obtaining transparent copolymers by treating solutions of the copolymers with $CO_2$ and water. However, this requires a distillation of the solvent to separate it from the water and the $CO_2$ before it is recycled for polymerization, since otherwise these products would act as poisons to the initiator.

Further, it must be remembered that as well as transparency and decoloration, the polymer must maintain all its mechanical shock resisting properties, something which is not ensured by the aforedescribed processes.

European Patent 84,795 also suggests the treatment of copolymers with carborylic diacids. That type of process enables practically all the aforementioned decoloration and mechanical properties stability conditions to be met, but without solving the above-identified problem of the water absorption.

It would therefore seem desirable to obtain a process for the treatment of vinyl aromatic/conjugated diene copolymers in such a way to ensure that they remain completely transparent, retain appropriate shock-resistant properties, can be brought into contact with foodstuffs and have an improved resistance to the water absorption.

SUMMARY OF THE INVENTION

The present invention relates to a process for the treatment of vinyl aromatic/conjugated diene copolymers so as to meet the aforementioned criteria.

The present invention relates to a process for the treatment of vinyl aromatic/conjugated diene copolymers which enable completely transparent copolymers to be obtained.

The present invention relates to a process for the treatment of vinyl aromatic/conjugated copolymers which have satisfactory impact-resistant properties.

The present invention relates to a process for the treatment of vinyl aromatic/conjugated diene copolymers which can be used in the field of foodstuffs.

The present invention also relates to a process for the treatment of vinyl aromatic/conjugated diene copolymers which enables one to considerably reduce their tendency to absorb water.

The present invention also relates to a process for the treatment of vinyl aromatic/conjugated diene copolymers which enables the copolymers to be readily used.

The process according to the present invention for the treatment of the vinyl aromatic/conjugated diene copolymers obtained from alkali-metal based catalysts (Me) at the initiation stage and deactivated in such a way that they show a termination of the alkali metal-alcoholate type (—O—Me), is characterized in that the copolymer is treated with a cyclic anhydride of polycarboxylic acid.

DESCRIPTION OF PREFERRED EMOBODIMENTS

The termination of the metal alkali-alcoholate type (—O—Me) of the copolymers treated according to the present invention can be obtained by using deactivating oxygenated coupling agents which lead to this type of termination. The termination of the metal alkali-alcoholate type(—O—Me) of the copolymers treated according to the present invention can also be obtained, after polymerization step, by the addition of an appropriate termination agent such as, e.g., compounds of the epoxyde, cetone or aldehyde type.

The process according to the present invention can be applied to copolymers of both the resinous and elastomeric types prepared by anionic polymerization in a solution of vinyl aromatic monomers and conjugated diene in the presence of initiators of the alkali-metal compound type. The resulting copolymer is deactivated in such a way that a termination of the (—O—ME) type is present.

This type of polymerization is generally performed in solution in the presence of a solvent and an initiator of the alkali-metal compound type. Moreover, during polymerization coupling agents are often used so as to couple the copolymers.

The copolymers thus formed are most often found in a linear or radial form, but they have a coloring which is unacceptable for the required uses.

The processes for the polymerization of the copolymers treated by the process according to the invention are clearly described in U.S. Pat. Nos. 3,619,537 and 4,091,053 and in European Patents 84,795 and 270,515. These polymerization processes can moreover be readily illustrated as follows.

Polymerization is performed in solution at a temperature of between −100° C. and +150° C., in the presence of a solvent and at a pressure adequate to keep the medium in the liquid phase. The solvents used can be paraffinic, cyclopariffinic or aromatic. Most frequently use is made of cyclohexane or a mixture of hexane and cyclohexane.

First a block of a non-elastomeric polymer is formed by initially charging one of the two monomers vinylaromatic (S), conjugated diene (B) or a mixture of the two monomers with a certain quantity of organolithium initiator in order to initiate polymerization and in order to form chains of living polymers having an end lithium atom on the chain. Then one of the monomers S or B or a mixture of the two monomers is charged successively and in the required order.

If polymerization is performed using coupling agents, the copolymers are brought into contact with particular coupling agents in order to form copolymers which are deactivated and show a (—O—Me) termination type.

In the case of a polymerization performed without a coupling agent the resulting copolymer is preferably treated with an epoxyde compound in order to obtain a copolymer which is deactivated and presents a (—O—Me) bond termination type.

Clearly, copolymers of radial or linear structure can be formed, and the blocks can be formed by pure homopolymers or statistical copolymers.

Whatever the copolymers obtained by the various processes of anionic polymerization in solution may be, the process according to the invention can be applied for the decoloration of said copolymers.

The conjugated diene monomer which can be used is one having 4 to 12 carbon atoms, such as 1,3-butadiene, isoprene, 2,3-dimethyl-1,3-butadiene, piperylene, 3-butyl-1, 3-octadiene and the like.

The vinyl aromatic monomer used can be styrene or substituted styrenes such as alpha-methylstyrene, para-methyl styrene, vinyl naphtalene, vinyl toluene and the like.

Since the process applies equally well to resinous and elastomeric copolymers, the ratio by weight between the conjugated diene and the vinyl aromatic can vary within wide limits, particularly between 1/99 and 85/15. More preferably, the ratio by weight between the conjugated diene and the vinyl aromatic is comprised between 15/85 and 65/35.

Initiators of alkaline metal compound type which can be used preferably comprise the following organolithium compounds: ethyl lithium, propyl lithium, n-butyl lithium, amyl lithium, hexyl lithium, cyclohexyl lithium, phenyl lithium, tolyl lithium, naphtyl lithium and their isomers, more particularly sec-butyl lithium and tert-butyl lithium.

When polymerization is performed with coupling agents, said coupling agents are selected in order to obtain copolymers with a (—O—Me) termination type. Among suitable coupling agents, one can quote polyaldehydes, polyketones, multiesters, multianhydrides and polyepoxides.

Polyepoxy compounds are preferably used. More preferably use is made of polymers of epoxy hydrocarbides, such as epoxy liquid polybutadiene and epoxy vegetable oils, such as epoxy soya oil and epoxy linseed oil. Other epoxy compounds can also be used, such as 1,2;5,6;9,10-triepoxydecane and the like.

Examples of polyaldehydes which may be quoted are 1 ,4,7-naphtalene tricarboxaldehyde, 1,7,9-anthracene-tricarboxaldehyde, 1,1,5-pentane tricarboxaldehyde, and the like.

Polyketones which may be quoted are 1,4,9,10-anthracene tetrone, 2,3-diacetonyl cyclohexane, and the like.

Examples of multiesters comprise diethyl adipate, triethyl citrate, 1,3,5-tricarbethoxybenzene, and the like.

Examples of compounds having more than one type of functional group comprise 1,2;4,5-diepoxy-3-pentanone, 1,2;4,5-diepoxy-3-hexanone, 1,2; 11,12-diepoxy-8-pentadecanone, 1,3; 18,19-diepoxy- 7,14-eicosanedione, and the like.

A bifunctional coupling agent is used if a linear coupled polymer is required rather than a branched polymer. While the process of the present invention can be applied to the coupled copolymers as well as to the linear non coupled copolymers, said process is preferably used for the treatment of the linear non coupled copolymers.

As a rule, the total quantity of coupling agent is less than 1.5 phr (parts per 100 parts of rubber).

It is also well understood that a non deactivating coupling agent can be used, and then the resulting copolymer be deactivated by the use of a terminator agent (e.g. a epoxy, ketone or aldehyde compound) without departing from the scope of the present invention.

The epoxy compounds used for the deactivation of the copolymers can be chosen among the following compounds: ethylene oxide, propylene oxide, 1,2-epoxy butane, 1,2-epoxy pentane, 1,2-epoxy-3-methyl butane, 2,3-epoxy-3-methyl butane, 1,2-epoxy-2,4,4-trimethyl pentane, 1,2-epoxy cyclohexane, 1,2-epoxy cyclooctane, 1,2-epoxy eicosane, styrene oxide, 1,2-epoxy triacontane, 1,2-epoxy-2-cyclohexyl butane, 3,4-epoxy-3,4-diethylhexane, 1,2-epoxy-2-(para-tolyl)butane, 2,3-epoxy-3-methyl-2-benzyl pentane, and the like. Propylene oxide is preferably used.

According to the process of the present invention, the deactivated vinyl aromatic/conjugated diene copolymers are treated with a cyclic anhydride of polycarboxylic acid.

The process according to the invention can be very advantageously applied when the copolymer recovery process is based on a direct elimination of the solvent.

Clearly, a proportion of the polymerization solvent can be removed before the polymer is treated by the process according to the invention.

Thus in one embodiment of the process according to the invention, the polymer is treated with a cyclic anhydride of polycarboxylic acid.

As examples of such anhydrides, one can quote the succinic, methylsuccinic, ethylsuccinic, n-propylsuccinic, iso-propylsuccinic, 2,2-dimethylsuccinic, 2,2-diethylsuccinic, dl-2,3-dimethylsuccinic, dl-2,3-diethylsuccinic, trimethylsuccinic, tetramethylsuccinic, tetraethylsuccinic, octenylsuccinic, n-decylsuccinic, 2-dodecen-1-ylsuccinic, n-dodecylsuccinic, tetradecylsuccinic, octadecylsuccinic, 2,3-diacetylsuccinic (diacethyl-L-tartaric), itaconic (2-methylenesuccinic), maleic, citraconic (methylmaleic), dimethylmaleic, diethylmaleic, diisopropylmaleic, glutaric, 2-methylglutaric, 2-ethylglutaric, 3-methylglutaric, 3-ethylglutaric, 3-ethyl-3-methylglutaric, dl-2,4-dimethylglutaric, dl-2,4-diethylglutaric, 3,3-dimethylglutaric, 3,3-diethylglutaric, 3,3-tetramethyleneglutaric, dl-2-chloroglutaric, hexafluoroglutaric, diglycolic (1,4-dioxacyclohexane-2,6-dione), 3,5-diacethyltetrahydropyran-2,4,6-trione, 1,2-cyclopropane dicarboxylic, 1,2-cyclobutane dicarboxylic, cis-1,3-cyclobutane dicarboxylic, cis-1,3-cyclopentane dicarboxylic, 1-cyclopentene-1,2-dicarboxylic, cis-1,2-cycloheptane dicarboxylic, trans-1,2-cycloheptane dicarboxylic, phthalic, 3-methylphthalic, 4-methylphthalic, homophthalic, 3,6-dichlorophtalic, 4,5-dichlorophthalic, tetrachlorophthalic, 3,4,5,6-tetrahydrophthalic (cyclohexene dicarboxylic), cis-1,2,3,6-tetrahydrophthalic (cyclohexenedicarboxylic),methyltetrahydrophthalic, cis-1, 2-cyclohexane dicarboxylic (hexahydrophthalic), trans-1,2-cyclohexane dicarboxylic (hexahydrophthalic), cis-1,3-cyclohexane dicarboxylic, cis-1,4-cyclohexane dicarboxylic, hexahydro-4-methylphthalic, 2-norbornene-2, 3-dicarboxylic, methyl-5-norbornene2,3-dicarboxylic,1,4,5, 6,7,7-hexachloro-5-norbornene-2,3-dicarboxylic, dl-camphoric, cineolic, 1,2,4-benzenetricarboxylic (trimellitic), 1,8-naphthalic (naphtalene-1,8-dicarboxylic), diphenic (diphenyl-2,2'-dicarboxylic), 2,3-pyridinedicarboxylic, 3,4-pyridinedicarboxylic.

One can also quote dianhydrides such as the pyromellitic, oxy-diphthalic, sulfone diphthalic, 3,3',4,4'-benzophenone tetracarboxylic (4,4'-carbonyl diphthalic), 5-(2,4-dioxotetrahydro-3-furanmethyl)-5-norbomene-2,3-dicarboxylic, 5-(2,4-dioxotetrahydro-3-furanmethyl)-5-norbomane-2,3-dicarboxylic, cis,cis,cis,cis, 1,2,3,4-cyclopentanetetracarboxylic, 1,2,3,4-cyclobutanetetracarboxylic, ethylene glycol(di-trimellitate) dicarboxylic. According to a preferred embodiment of the present invention, cyclic anhydrides of dicarboxylic acids are used.

Preferably succinic, maleic, glutaric or phthalic anhydrides are used. More preferably, hexahydro-4-methylphthalic anhydride and glutaric anhydride are used.

According to another embodiment of the present invention, it was found that the combination of these anhydrides with monocarboxylic acids having from 2 to 4 carbon atoms (preferably propionic acid) could advantageously be used.

The anhydride/monocarboxylic acid mixtures can comprise up to 50% by weight of monocarboxylic acid. Preferably, these mixtures comprise up to 40% by weight of monocarboxylic acid.

The quantity of anhydride or anhydride/monocarboxylic acid mixture to be used is between 0.02 and 2.0 parts per 100 parts of polymer, preferably between 0.1 and 0.5 parts per 100 parts of polymer.

In the process according to the invention it is possible to add to the polymer solution the anhydrides on their own or mixed with one another, or mixed with a solvent, or under melted form. When a monocarboxylic acid is added, the addition can be done the same time or, preferably, just before the anhydride.

The following Examples are given to better illustrate the process according to the invention, without however limiting its scope.

EXAMPLES

A copolymer of type $S_1$-$B_1$-B/S-$S_2$ was prepared which had a styrene-butadiene ratio by weight of 73/27.

The following quantities, calculated per 100 parts by weight of monomers of styrene and 1,3-butadiene were introduced into a pressurized reactor.

First 471 parts of a solvent mixture were introduced formed by 85% cyclohexane and 15% n-hexane. Then THF was introduced at the rate of 0.05 phr and the monomeric styrene at the rate of 16.7 parts.

The temperature of the reaction medium was then raised to 65° C. and n-butyl lithium was injected in the form of a 20% solution into the cyclohexane, to obtain a value of 0.083 phr in the medium.

Then sequenced polymerization was continued by simultaneously injecting 25 parts of 1,3-butadiene and 58.3 parts of styrene. The living polymer thus formed was deactivated by the addition of 0.075 phr of propylene oxide.

Then the quantity of cyclic anhydride or the mixture cyclic anhydride/monocarboxylic acid was introduced which is indicated in the Table 1 hereafter, and also a small quantity of an antioxidant system formed by 0.4 phr of Irganox 1076 (trademark of Ciba-Geigy; Octadecyl 3,5-di-tert-butyl-4-hydroxyhydrocinnamate) and 0.7 phr of TNPP (Tri-nonylphenylphosphite). The appearance of the solution obtained on completion of that stage is indicated in Table 1.

The solvent of these polymer solutions so obtained was removed by treatment under a roll mill at 160° C. for 40 minutes. The materials are then molded by compression at 150° C. (40 kg/cm$^2$) under the form of sheets of 2 mm in thickness in order to determine their optical properties.

In Table 1, the sheets have been submitted to an aging process at room temperature during 24 hours. The transmittance and the opacity index have been measured according to the ASTM D 1003 norm, the yellow index according to the ASTM D 1925 norm.

Table 2 gives the results of a visual determination of the appearance of the sheets after 24 hours aging at room temperature.

a) in vapour phase without water b) immersed under 1 cm deionised water.

In Table 3, we evaluated the tendency to absorb water for 1 mm thickness sheets (obtained as described hereabove), submitted to a relative humidity of 75% obtained in a closed vessel, with a NaCl—H$_2$O system at 25° C.

TABLE 1

| | Amount (phr) | Visual Appearance | Opacity Index | Optical properties Transmittance | Yellow Index |
|---|---|---|---|---|---|
| 1. dl-camphoric anhydride | 0.240 | SY, T | 3.5 | 90.5 | 5.1 |
| 2. 1,2,4-benzene tricarboxylic anhydride | 0.120 | C, T | 5.2 | 90.9 | |
| 3. hexahydro-4-methyl-phtalic anhydride | 0.210 | SY, T | 1.0 | 91.2 | 5.0 |
| 4. hexahydro-4-methyl-phtalic anhydride/ propionic acid (80/20 by weight) (0) | 0.200 | C, T | 1.9 | 91.1 | 2.3 |
| 5. hexahydro-4-methyl-phtalic anhydride/ propionic acid (85.5/14.5 by weight) (1) | 0.177 | C, T | 0.9 | 91.6 | −0.2 |
| 6. hexahydro-4-methyl-phtalic anhydride/ propionic acid (81/19 by weight) (2) | 0.208 | SY, T | 1.0 | 91.2 | 5.0 |
| 7. glutaric anhydride | 0.143 | SY, T | 3.1 | 90.7 | 7.3 |
| 8. glutaric anhydride/propionic acid (60/40 by weight) (0) | 0.076 | C, T | 4.0 | 90.5 | 3.3 |
| 9. glutaric anhydride/propionic acid (80/20 by weight) (0) | 0.109 | C, T | 1.1 | 91.5 | 1.0 |
| 10. glutaric anhydride/propionic acid (80/20 by weight) (2) | 0.109 | C, T | 0.9 | 91.1 | 0.5 |

TABLE 1-continued

| | Amount (phr) | Visual Appearance | Opacity Index | Optical properties Transmittance | Yellow Index |
|---|---|---|---|---|---|
| 11. glutaric anhydride/propionic acid (80/20 by weight) (1) | 0.109 | C, T | 1.0 | 91.7 | 2.9 |
| 12. hexahydrophtalic anhydride | 0.194 | SY, T | 3.8 | 90.9 | 3.5 |
| 13. hexahydrophtalic anhydride/ propionic acid (90.8/9.2 by weight) (0) | 0.187 | C, T | 1.5 | 91.1 | 1.3 |
| 14. maleic anhydride/propionic acid (77.2/22.8 by weight) (1) | 0.102 | C, T | 0.8 | 91.3 | 4.4 |
| 15. phtalic anhydride/propionic acid (83.3/16.7 by weight) (1) | 0.150 | C, T | 0.5 | 90.9 | 3.6 |
| 16. octenylsuccinic anhydride (87.7/22.3 by weight) (1) | 0.216 | C, T | 1.3 | 91.4 | 1.8 |
| C1. propionic acid | 0.095 | C, STR | 8.2 | 86.2 | 5.7 |
| C2. propionic anhydride | 0.172 | SY, STR | 3.6 | 87.9 | 7.3 |

C: Colorless/Y: Yellow/SY: Slightly Yellow/T: Transparent/TR: Trouble/STR: Slightly Trouble
(1) acid added just before the anhydride
(2) acid added just after the anhydride
(0) acid and anhydride added at the same time

TABLE 2

| | Amount (phr) | Visual Appearance | |
|---|---|---|---|
| | | vapor phase | liquid phase (water) |
| 1. hexahydro-4-methyl-phtalic anhydride | 0.210 | T | T |
| 2. hexahydro-4-methyl-phtalic anhydride/ propionic acid (85.5/14.5 by weight) (1) | 0.177 | T | T |
| 3. glutaric anhydride | 0.143 | T | T |
| 4. glutaric anhydride/propionic acid (80/20 by weight) (0) | 0.109 | T | T |
| 5. glutaric anhydride/propionic acid (80/20 by weight) (1) | 0.109 | T | T |
| 6. glutaric anhydride/propionic acid (80/20 by weight) (2) | 0.109 | T | T |
| C1. propionic acid | 0.095 | STR | TR |

T: Transparent/TR: Trouble/STR: Slightly Trouble
(1) acid added just before the anhydride
(2) acid added just after the anhydride
(0) acid and anhydride added at the same time

TABLE 3

| | Amount (phr) | Water absorption (ppm) | | |
|---|---|---|---|---|
| | | 1 day | 2 days | 9 days |
| 1. hexahydro-4-methyl-phtalic anhydride | 0.210 | 112 | 296 | |
| 2. glutaric anhydride | 0.143 | 495 | 571 | 630 |
| C1. propionic acid | 0.095 | 788 | 1157 | 1495 |

What is claimed is:

1. A process for producing vinyl aromatic conjugated diene copolymers, the process consisting essentially of an initiation stage in which vinyl aromatic/conjugated diene block copolymers are formed from vinyl aromatic monomers and conjugated diene monomers using alkali-metal based catalysts (Me); a deactivation stage in which the copolymers are deactivated by using at least one deactivating agent in such a way that the copolymers have alkali metal-alcoholate terminations (—O—Me); treating the copolymer with at least one cyclic anhydride of polycarboxylic acid; and thereafter recovering the cyclic anhydride-treated copolymer.

2. The process according to claim 1 characterized in that the copolymer is treated with a cyclic anhydride of a dicarboxylic acid.

3. The process according to claim 2 characterized in that the copolymer is treated with an anhydride selected from group consisting of succinic, maleic, glutaric and phthalic anhydrides.

4. The process according to claim 3 characterized in that the copolymer is treated with an anhydride selected from the group consisting of hexahydro-4-methylphthalic and glutaric anhydrides.

5. The process according to claim 1 characterized in that the copolymer is also treated with a monocarboxylic acid having from 2 to 4 carbon atoms.

6. The process according to claim 5 characterized in that the weight ratio of cyclic anhydride to monocarboxylic acid is greater than 50%.

7. The process according to claim 6 characterized in that the quantity of anhydride and monocarboxylic acid mixture comprises between 0.02 and 2.0 parts per 100 parts of polymer.

8. The process according to claim 6 characterized in that the monocarboxylic acid is added just before the addition of the cyclic anhydride.

* * * * *